(12) United States Patent
Alnaim et al.

(10) Patent No.: US 11,984,039 B1
(45) Date of Patent: May 14, 2024

(54) FOCUSED READING CYLINDER

(71) Applicant: KING FAISAL UNIVERSITY, Al-Ahsa (SA)

(72) Inventors: Fahad Alnaim, Al-Ahsa (SA); Abdulrahman Alsayed, Al-Ahsa (SA); Ahmed Aljaafari, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/201,301

(22) Filed: May 24, 2023

(51) Int. Cl.
*G09B 17/04* (2006.01)
(52) U.S. Cl.
CPC ..................... *G09B 17/04* (2013.01)
(58) Field of Classification Search
CPC ...................................... G09B 17/04
USPC ........................................... 434/183
See application file for complete search history.

(56) References Cited

U.S. PATENT DOCUMENTS

| | | | |
|---|---|---|---|
| 2,752,705 A | 7/1956 | Ebersold | |
| 5,769,417 A | 6/1998 | Richer et al. | |
| 9,189,969 B1 * | 11/2015 | Taylor | G09B 17/02 |
| 9,851,476 B2 | 12/2017 | Cole | |
| 2003/0172564 A1 | 9/2003 | Perry et al. | |

FOREIGN PATENT DOCUMENTS

| | | |
|---|---|---|
| CN | 210865244 U | 6/2020 |
| FR | 2777666 A1 | 10/1999 |
| GB | 1204144 A | 9/1970 |

OTHER PUBLICATIONS

"5x Portable Cylinder Reading Magnifier Hands Free Magnifying Glass" by Stoemi.
"Reizen 2.5x Hands Free Full Page Magnifier for Reading" by Reizen.

* cited by examiner

*Primary Examiner* — Kesha Frisby
(74) *Attorney, Agent, or Firm* — Nath, Goldberg & Meyer; Richard C. Litman

(57) ABSTRACT

The focused reading cylinder has an outer cylinder and an inner cylinder selectively rotatable within the outer cylinder. The outer cylinder has an elongated main reading slot defined therein dimensioned and configured to expose a single line of text of a document retained between the two cylinders for reading. The top and bottom edges or borders of the main reading slot may have rows of light emitting diodes (LEDs) mounted thereon to illuminate the text, either in conventional white light or more relaxing colors. A document feeder slot is defined in the outer cylinder and extends parallel to the main reading slot. The inner cylinder is made from or coated with rubber to grip the document between the two cylinders, and has a hand crank or knob for selectively advancing the inner cylinder and document.

8 Claims, 2 Drawing Sheets

FOCUSED READING CYLINDER

BACKGROUND

1. Field

The disclosure of the present patent application relates to reading documents, and particularly to a focused reading cylinder that exhibits a document for reading one line at a time.

2. Description of the Related Art

In modern society, people sometimes have difficulty in properly comprehending documents that they read. Some people have visual impairments that cause successive lines of text to blur together. Other individuals try to read documents too quickly, resulting in the content of two successive lines becoming inextricably intertwined or mixed together. Consequently, a device that trains people or constricts people having such difficulties to read documents one line at a time would be a benefit to the art. Thus, a focused reading cylinder solving the aforementioned problems is desired.

SUMMARY

The focused reading cylinder has an outer cylinder and an inner cylinder selectively rotatable within the outer cylinder. The outer cylinder has an elongated main reading slot defined therein dimensioned and configured to expose a single line of text of a document retained between the two cylinders for reading. The top and bottom edges or borders of the main reading slot may have rows of light emitting diodes (LEDs) mounted thereon to illuminate the text, either in conventional white light or more relaxing colors. A document feeder slot is defined in the outer cylinder and extends parallel to the main reading slot. The inner cylinder is made from or coated with rubber to grip the document between the two cylinders, and has a hand crank or knob for selectively advancing the inner cylinder and document.

The focused reading cylinder may be furnished in kit form with selectively interchangeable lenses insertable over the main reading slots. The interchangeable lenses may include, for example, colored lens (such as yellow and blue), magnifying lenses, or ruled lenses having dividers for separating letters in the text.

These and other features of the present subject matter will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The focused reading cylinder has an outer cylinder and an inner cylinder selectively rotatable within the outer cylinder. The outer cylinder has an elongated main reading slot defined therein dimensioned and configured to expose a single line of text of a document retained between the two cylinders for reading. The top and bottom edges or borders of the main reading slot may have rows of light emitting diodes (LEDs) mounted thereon to illuminate the text, either in conventional white light or more relaxing colors. A document feeder slot is defined in the outer cylinder and extends parallel to the main reading slot. The inner cylinder is made from or coated with rubber to grip the document between the two cylinders, and has a hand crank or knob for selectively advancing the inner cylinder and document.

Figure 1:
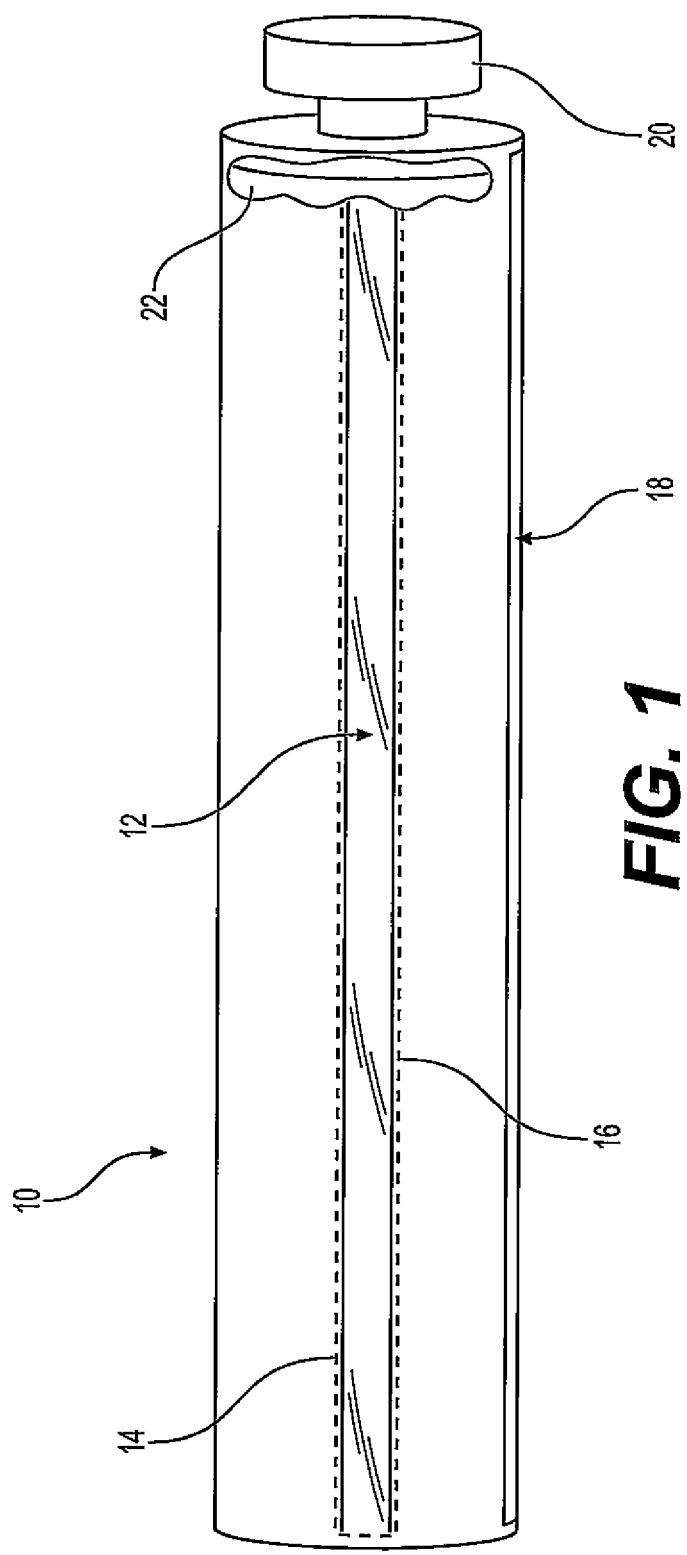
FIG. 1 is a perspective view of a focused reading cylinder, partially broken away to show the inner cylinder.

As shown in FIG. 1, the focused reading cylinder 10 has an outer cylinder and an inner cylinder 22 selectively rotatable within the outer cylinder. The outer cylinder has an elongated main reading slot 12 defined therein dimensioned and configured to expose a single line of text of a document retained between the two cylinders for reading (a gap of about one centimeter extending for the length of the main reading slot). The top and bottom edges or borders of the main reading slot may have rows of light emitting diodes (LEDs) 14, 16 mounted thereon to illuminate the text, either in conventional white light or more relaxing colors. A document feeder slot 18 is defined in the outer cylinder and extends parallel to the main reading slot 12. The inner cylinder 22 is made from or coated with rubber to grip the document between the two cylinders, and has a hand crank or knob 20 for selectively advancing the inner cylinder and document.

Figure 2:
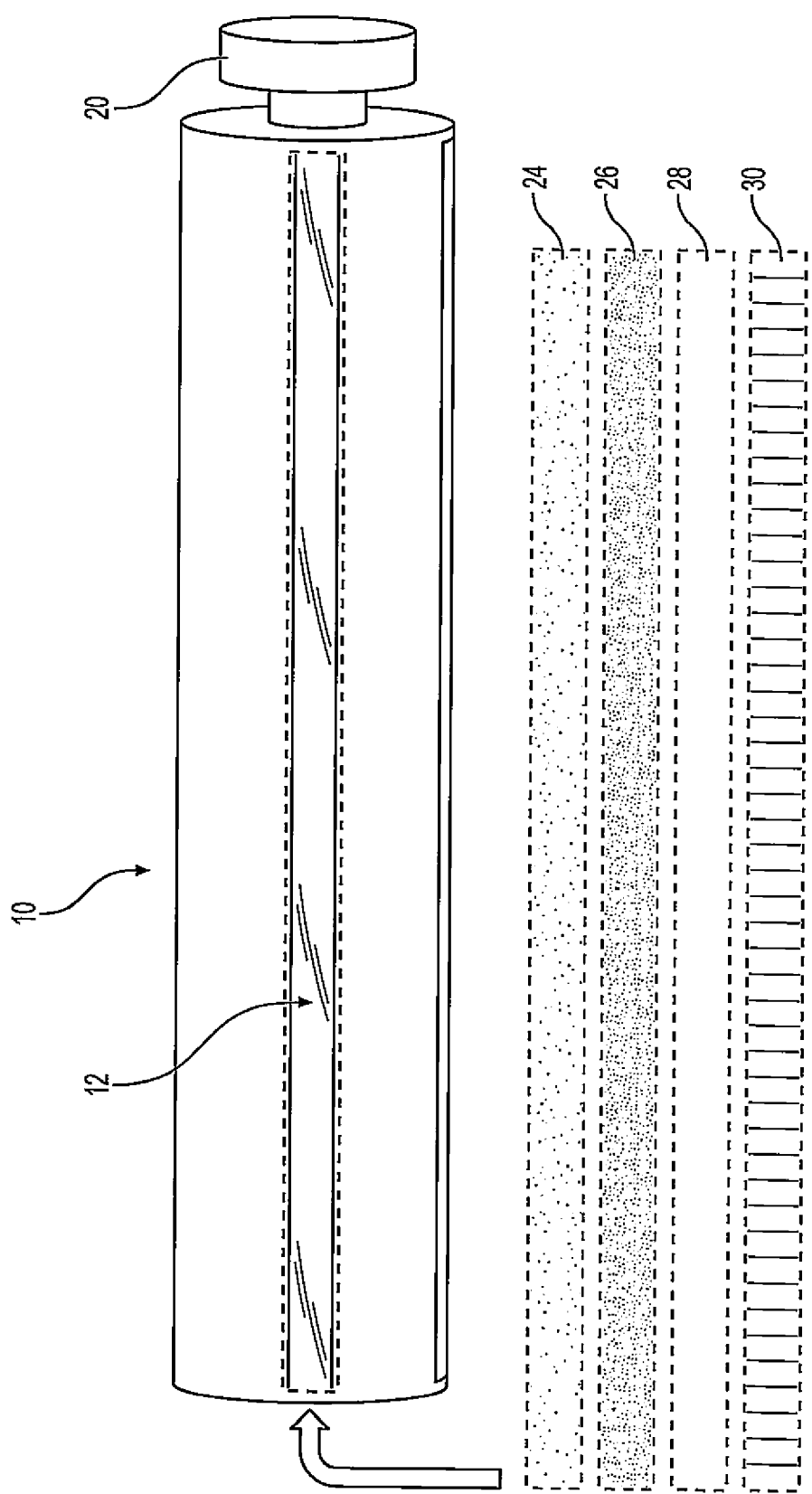
FIG. 2 is a perspective view of a focused reading cylinder kit having interchangeable lenses insertable over the main reading slot.

As shown in FIG. 2, the focused reading cylinder 10 may be furnished in kit form with selectively interchangeable lenses insertable over the main reading slot 12. The interchangeable lenses may include, for example, colored lens (such as yellow 24 and blue 26), magnifying lenses 28, or ruled lenses 30 having dividers for separating letters in the text.

The focused reading cylinder 10 helps everyone who wants to be in focus while reading a passage in a document.

The focused reading cylinder 10 can be used to serve people with dyslexia, with reading weakness, with attention deficit disorder, and those who have a problem with visual processing. The focused reading cylinder 10 provides several supports such as decreased visual field (the reader will not be able to look at the upper and lower lines); using the reader's favorite colors that help focus on reading words; using the word divider into letters to help a child spell correctly. Therefore, the focused reading cylinder 10 helps the child to be independent in learning, and to be more integrated into an inclusive education classroom.

The focused reading cylinder 10 can be used to serve people with visual impairments by limiting the visual field or using magnifiers.

The focused reading cylinder 10 can be used to serve the elderly people, instead of raising and lowering their hand to control the paper, the focused reading cylinder 10 provides easy control of the paper with the stability of the hand.

The focused reading cylinder 10 can be used to serve those who want to train themselves to read quickly by giving themselves a specific time for each line.

There are many people who prefer to read while lying down on their back. Thus, the focused reading cylinder 10 provides an easy way to control the paper.

It is to be understood that the focused reading cylinder is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A focused reading cylinder, comprising:
   an elongated outer cylinder and a selectively rotatable inner cylinder disposed within the outer cylinder, the outer cylinder having a main reading slot defined therein physically dimensioned and configured to expose a single line of text of a document retained between the outer cylinder and the inner cylinder;
   a knob attached to the inner cylinder for selectively advancing the document a single line of text at a time,
   wherein the inner cylinder and the outer cylinder both contact the document when the single line of text is exposed through the main reading slot, and
   wherein the main reading slot has an upper border and a lower border, the focused reading cylinder further comprising:
      an upper row of LED lights mounted on the upper border of the main reading slot for illuminating text exposed through the main reading slot; and
      a lower row of LED lights mounted on the lower border of the main reading slot for illuminating text exposed through the main reading slot.

2. The focused reading cylinder according to claim 1, wherein the main reading slot has a width of one centimeter extending for the width of the main reading slot.

3. The focused reading cylinder according to claim 1, wherein the outer cylinder has a document feeder slot defined therein extending parallel to the main reading slot for inserting a document between the outer cylinder and the inner cylinder.

4. The focused reading cylinder according to claim 1, wherein the inner cylinder is made from rubber for gripping a document between the outer cylinder and the inner cylinder.

5. A focused reading cylinder kit, comprising:
   a focused reading cylinder according to claim 1; and
   a plurality of interchangeable lenses selectively mountable over the main reading slot.

6. The focused reading cylinder kit according to claim 5, wherein said plurality of interchangeable lenses includes at least two lenses having different colors.

7. The focused reading cylinder kit according to claim 5, wherein said plurality of interchangeable lenses includes a magnifying lens.

8. The focused reading cylinder kit according to claim 5, wherein said plurality of interchangeable lenses includes a ruled lens having ruled markings for separating letters in a word of text.

* * * * *